United States Patent
Ishii et al.

(10) Patent No.: US 9,264,983 B2
(45) Date of Patent: Feb. 16, 2016

(54) MOBILE COMMUNICATION METHOD, MOBILE EXCHANGE STATION, RADIO BASE STATION AND MOBILE STATION

(75) Inventors: Minami Ishii, Yokohama (JP); Takehiro Nakamura, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 996 days.

(21) Appl. No.: 12/677,209

(22) PCT Filed: Sep. 5, 2008

(86) PCT No.: PCT/JP2008/066099
§ 371 (c)(1),
(2), (4) Date: May 25, 2010

(87) PCT Pub. No.: WO2009/034930
PCT Pub. Date: Mar. 19, 2009

(65) Prior Publication Data
US 2010/0331034 A1    Dec. 30, 2010

(30) Foreign Application Priority Data

Sep. 10, 2007    (JP) .................. 2007-234618

(51) Int. Cl.
*H04B 7/00* (2006.01)
*H04W 48/18* (2009.01)
*H04W 36/14* (2009.01)

(52) U.S. Cl.
CPC .............. *H04W 48/18* (2013.01); *H04W 36/14* (2013.01)

(58) Field of Classification Search
CPC .................... H04W 36/0022; H04B 5/0037
USPC .......................................... 455/512
See application file for complete search history.

(56) References Cited

U.S. PATENT DOCUMENTS

| 2004/0192375 | A1  | 9/2004  | Cho et al. |
| 2005/0192034 | A1* | 9/2005  | Munje ................. 455/458 |
| 2006/0111106 | A1  | 5/2006  | Moon et al. |
| 2006/0182069 | A1  | 8/2006  | Yu |
| 2007/0190997 | A1* | 8/2007  | Moon et al. .......... 455/422.1 |
| 2007/0275717 | A1* | 11/2007 | Edge et al. ............ 455/434 |
| 2008/0013492 | A1* | 1/2008  | Lee et al. ............... 370/331 |

(Continued)

FOREIGN PATENT DOCUMENTS

| JP | 2002-535897 A | 10/2002 |
| JP | 2003-169359 A | 6/2003 |
| JP | 2006135445 A  | 5/2006 |

(Continued)

OTHER PUBLICATIONS

Japanese Office Action for Application No. 2009-532168, mailed on Oct. 5, 2010 (3 pages).

(Continued)

*Primary Examiner* — Ankur Jain
(74) *Attorney, Agent, or Firm* — Osha Liang LLP

(57) ABSTRACT

A mobile communication method according to the present invention includes: notifying, from a network node (200, 300) to a mobile station (100), a communication service provided by a target radio access technology in which the mobile station (100) is to be in idle mode; storing, at the mobile station (100), the communication service notified by the network node (200, 300); and starting, at the mobile station (100), a connection procedure on the basis of the stored communication service.

3 Claims, 5 Drawing Sheets

(56) References Cited

U.S. PATENT DOCUMENTS

2008/0220772 A1* 9/2008 Islam et al. .............. 455/432.2
2010/0167736 A1 7/2010 Kobayashi

FOREIGN PATENT DOCUMENTS

| JP | 2007043753 A | 2/2007 |
|----|---|---|
| JP | 2007-510366 A | 4/2007 |
| WO | 00/42787 A1 | 7/2000 |
| WO | 2005/046106 A2 | 5/2005 |
| WO | 2007015795 A2 | 2/2007 |
| WO | 2007097145 A1 | 8/2007 |

OTHER PUBLICATIONS

Patent Abstracts of Japan for Japanese Publication No. 2003-169359, publication date Jun. 13, 2003 (1 page).
Nokia Siemens Networks et al., "Prioritisation of inter-RAT cells for GERAN-E-UTRAN interworking," 3GPP RAN-GERAN Workshop on GERAN-E-UTRAN interworking, GR-070018, Sep. 28, 2007, 5 pages.
Ericsson, "Drivers for Inter-RAT Radio Resource Management," 3GPP TSG-RAN WG2 Meeting #56-bis, R2-070051, Jan. 19, 2007, 4 pages.
International Search Report issued in PCT/JP2008/066099, mailed on Oct. 21, 2008, w/translation, 5 pages.
Written Opinion issued in PCT/JP2008/066099, mailed on Oct. 21, 2008, 3 pages.
3GPP TR 25.913 V7.3.0, Mar. 2006, "Requirements for Evolved UTRA (E-UTRA) and Evolved UTRAN ("E-UTRAN), 18 pages.
Extended European Search Report for Application No. 08830961.2 mailed May 20, 2011 (10 pages).
3GPP ETSI TS 125 304 V7.1.0, Universal Mobile Telecommunications Systems (UMTS), "User Equipment (UE) Procedures in Idle Mode and Procedures for Cell Reselection in Connected Mode", Dec. 2006 (40 pages).
Office Action for Chinese Patent Application No. 200880106425.3 issued May 2, 2012, with English translation thereof (16 pages).
Japanese Office Action for Application No. 2009-532168, mailed on Jul. 13, 2010 (4 pages).
Patent Abstracts of Japan for Japanese Publication No. 2007-043753, publication date Feb. 15, 2007 (1 page).
Patent Abstracts of Japan for Japanese Publication No. 2006-135445, publication date May 25, 2006 (1 page).
Office Action for Russian Application No. 2010112491/07 dated Aug. 7, 2012, with English translation thereof (10 pages).
Office Action for European Application No. 08 830 961.2 dated Feb. 15, 2013 (5 pages).
Office Action issued in counterpart Chinese application No. 200880106425.3 mailed Apr. 8, 2014 (12 pages).

* cited by examiner

FIG. 3

(a) RADIO ACCESS TECHNOLOGY X

| COMMUNICATION SERVICE | PROVIDED OR NOT PROVIDED | SERVICE IDENTIFIER | CONNECTION DESTINATION ADDRESS | QoS | BEARER IDENTIFIER | LABEL |
|---|---|---|---|---|---|---|
| VOICE COMMUNICATIONS | PROVIDED | 1 | A | X1 | B1 | Label 1 |
| DATA COMMUNICATIONS | PROVIDED | 2 | B | X2 | B2 | Label 2 |
| TV TELEPHONE COMMUNICATIONS | PROVIDED | 3 | C | X3 | B3 | Label 3 |
| LOCATION INFORMATION | PROVIDED | 4 | D | X4 | B4 | Label 4 |

(b) RADIO ACCESS TECHNOLOGY X

| COMMUNICATION SERVICE | PRIORITY IDENTIFIER | PRIORITY PROBABILITY | MAXIMUM TRANSMISSION RATE | GUARANTEED MINIMUM RATE |
|---|---|---|---|---|
| VOICE COMMUNICATIONS | P1 | 80% | 10Mbps | 5Mbps |
| DATA COMMUNICATIONS | P2 | 60% | 50Mbps | 10Mbps |
| TV TELEPHONE COMMUNICATIONS | P3 | 50% | 80Mbps | 30Mbps |
| LOCATION INFORMATION | P4 | 30% | 100Mbps | 50Mbps |

MOBILE COMMUNICATION METHOD, MOBILE EXCHANGE STATION, RADIO BASE STATION AND MOBILE STATION

TECHNICAL FIELD

The present invention relates to a mobile communication method, a mobile exchange station, a radio base station and a mobile station.

BACKGROUND ART

Conventional mobile communication systems provide voice communications, TV telephone communications and the like with stringent delay requirements by using circuit switching (CS) while providing data communications and the like with loose delay requirements by using packet switching (PS).

Meanwhile, when a new radio access technology (RAT) is introduced to a mobile communication system, the stability of the mobile communication system is given the top priority, and it is therefore general to use the new RAT to provide not various types of communication service but only limited types of communication service at an early stage of the introduction.

For example, assume that the LTE (Long Term Evolution) system is introduced as a new RAT to an area in which communication, service is provided by using the UMTS (Universal Mobile Terrestrial System) as a RAT, the LTE system enabling communications which are more efficient and faster than those by the UMTS. In this case, considering that the LTE system is a mobile communication system using PS only, a conceivable introduction scenario is to provide communication service restricted to data communications at the early stage of the introduction, and to provide communication service, such as voice communications, with stringent delay requirements after the operation of the mobile communication system is stabilized (see Non-patent Document 1).

Next, referring to FIG. 7, an example of a method of providing communication service at an early stage of the introduction of the LTE system is described.

Here, a mobile station in an idle mode in the UMTS needs to perform the procedure shown in FIG. 7 in the UMTS, switch to the LTE system, and then start data communications in the LTE system, for example.

This is because the LTE system can provide more efficient and faster communications than the UMTS can. A concrete example of the method of providing communication service is described below with reference to FIG. 7.

As shown in FIG. 12, in Step 1, the mobile station transmits a "RRC Connection Request" for requesting a setup of a RRC connection, to a radio controller apparatus.

In Step 2, the radio controller apparatus transmits a "Radio Link Setup Request" for requesting a setup of a radio link, to a radio base station.

In Step 3, the radio base station performs a setup of the radio link in accordance with the "Radio Link Setup Request", and then transmits a "Radio Link Setup Response" for reporting the completion of the setup of the radio link, to the radio controller apparatus.

In Step 4, the radio controller apparatus transmits a "RRC Connection Setup" for performing a setup of the RRC connection, to the mobile station.

In Step 5, the mobile station performs a setup of the RRC connection in accordance with the "RRC Connection Setup", and then transmits a "RRC Connection Setup Complete" for reporting the completion of the setup of the RRC connection, to the radio controller apparatus.

In Step 6, the mobile station transmits a "Service Request" to a mobile exchange station through the radio controller apparatus.

In Step 7, the radio controller apparatus transmits the "Service Request" received from the mobile station, to the mobile exchange station.

In Step 8, the mobile exchange station transmits a "Security Mode Command" to the radio controller apparatus, so as to perform a security-related setup.

In Step 9, the radio controller apparatus transmits the "Security Mode Command" to the mobile station, so as to perform the security-related setup.

In Step 10, the mobile station transmits a "Security Mode Complete" for notifying a setup of a security-related parameter and the completion of the setup, to the radio controller apparatus.

In Step 11, the radio controller apparatus transmits the "Security Mode Complete" for notifying the completion of the setup of the security-related parameter, to the mobile exchange station.

In Step 12, the mobile station transmits an "Active PDP Context Request" for requesting a setup of a PDP context, to the mobile exchange station through the radio controller apparatus.

In Step 13, the radio controller apparatus transmits the "Active PDP Context Request" received from the mobile station, to the mobile exchange station.

In Step 14, the mobile exchange station transmits a "RAB Assignment Request" for requesting a setup of a radio access bearer (RAB), to the radio controller apparatus.

In Step 15, the radio controller apparatus determines whether or not to perform Inter-RAT handover to the LTE system, on the basis of information on the RAB whose setup is requested by the received "RAB Assignment Request".

In Step 16, when determining to perform Inter-RAT handover to the LTE system, the radio controller apparatus transmits a "RAB Assignment Response" for reporting that the RAB whose setup is requested is not to be set up, to the mobile exchange station.

Moreover, when determining to perform Inter-RAT handover to the LTE system, in Step 17, the radio controller apparatus transmits a "Relocation Required" for requesting Inter-RAT handover to the LTE system, to the mobile exchange station.

In Step 18, the mobile exchange station transmits a "Relocation Command" for instructing Inter-RAT handover to the LTE system, to the radio controller apparatus.

In Step 19, the radio controller apparatus transmits a "Handover from UTRAN Command" for instruct to perform Inter-RAT handover to the LTE system, to the mobile station.

In Step 20, the mobile station changes the radio access technology of a target for connection to the LTE system, and then starts data communications in the LTE system.

By contrast, assume that a mobile station in an idle mode in the LTE system requests to start voice communications. In this case, since the LTE system does not provide any voice communication service bearer, the mobile station needs to be instructed to perform Inter-RAT handover to the UMTS at a stage for a setup of a voice service bearer in a procedure for a call setup in the LTE system, and to start voice communications in the UMTS.

Non-patent Document 1: 3GPP TR25.913 V7.3.0, "Technical specification group radio access network; Requirement for Evolved UTRA (E-UTRA) Release 7.5"

However, the above-described conventional mobile communication system has the following problems.

Specifically, in the conventional mobile communication system, if a RAT in which the mobile station is in an idle mode does not provide communication service requested by the mobile station, or if there is a different RAT capable of providing the communication service more efficiently than the RAT being used provides, the mobile station is instructed to perform handover to the different RAT in a quite late stage in a connection setup procedure (after reaching Step 18 in the example of FIG. 12). This increases processing load on each access node of the RATs, and increases connection delay occurring between a calling operation by a user and completion of establishing a User-plane (U-plane).

DISCLOSURE OF TEE INVENTION

The present invention is made in view of the above-described problems, and is aimed to provide a mobile communication method, a mobile exchange station, a radio base station and a mobile station which are capable of reducing processing load of each network node and reducing a connection time to establish a U—plane after a calling operation by a user. These reductions are accomplished by autonomously selecting a cell in a RAT suitable for providing the communication service, on the basis of communication service requested by the mobile station.

A first aspect of the present invention is summarized as a mobile communication method in a mobile communication system including a plurality of radio access technologies, the mobile communication method including the steps of; notifying, from a network node to a mobile station, at least one of communication service provided by each of the radio access technologies and priority of the communication service; storing, at the mobile station, at least one of the communication service provided by each of the radio access technologies and the priority of the communication service notified by the network node; determining, at the mobile station, a cell in which the mobile station starts a connection procedure on the basis of at least one of the communication service provided by each of the radio access technologies and the priority of the communication service which are stored; and starting, at the mobile station, a connection procedure with the determined cell.

A second aspect of the present invention is summarized as a mobile exchange station used in a mobile communication system including a plurality of radio access technologies, the mobile exchange station including: a providing-service manager unit configured to manage at least one of communication service provided by each of the radio access technologies and priority of the communication; and a providing-service notification unit configured to notify, to a mobile station, a relationship each of the radio access technologies with at least one of the communication service and the priority of the communication, the relationship being managed by the providing-service manager unit.

In the second aspect, the communication service can be specified by any one of a service identifier for identifying the communication service, a connection destination address for the communication service, service quality information on the communication service, a label indicating a priority class of the communication service, and a bearer identifier for identifying a bearer for the communication service.

In the second aspect, the providing-service notification unit can be configured to notify priority of the communication service, and at least one of a priority identifier for identifying the priority of the communication service, a priority probability showing a probability at which the communication service is prioritized, a maximum transmission rate of the communication service, and a guaranteed minimum rate for the communication service can be used as the priority of the communication service.

In the second aspect, the providing-service notification unit can be configured to notify the mobile station of the target radio access technology, in at least one of an Attach procedure, a location registration information update procedure and a paging procedure.

A third aspect of the present invention is summarized as a radio base station used in a mobile communication system including a plurality of radio access technologies, the radio base station including: a providing-service manager unit configured to manage at least one of communication service provided by each of the radio access technologies and priority of the communication service; and a providing-service notification unit configured to notify, to a mobile station, a relationship of each of the access technologies with at least one of the corresponding communication service and the priority of the communication service, the relationship being managed by the providing-service manager unit.

In the third aspect, the communication service can be specified by any one of a service identifier for identifying the communication service, a connection destination address for the communication service, service quality information on the communication service, a label indicating a priority class of the communication service, and a bearer identifier for identifying a bearer for the communication service.

In the third aspect, at least one of a priority identifier for identifying the priority of the communication service, a priority probability showing a probability at which the communication service is prioritized, a maximum transmission rate of the communication service, and a guaranteed minimum rate for the communication service can be used as the priority of the communication service.

In the third aspect, the providing-service notification unit can be configured to notify, to the mobile station, the relationship of each of the access technologies with at least one of the corresponding communication service and the priority of the communication service, in at least one of a broadcast information notifying procedure, a connection procedure and a release procedure.

A fourth aspect of the present invention is summarized as a mobile station used in a mobile communication system including a plurality of radio access technologies, the mobile station including: a providing-service storage unit configured to receive and store, from a network node, at least one of communication service provided by each of the radio access technologies and priority of the communication service; a cell selection performing unit configured to determine a cell in which the mobile station starts a connection procedure on the basis of at least one of the communication service provided by each of the radio access technologies and the priority of the communication service which are stored by the providing-service storage unit; and a connection procedure performing unit configured to start a connection procedure with the cell determined by the cell selection performing unit.

In the fourth aspect, the communication service can be specified by any one of a service identifier for identifying the communication service, a connection destination address for the communication service, service quality information on the communication service, a label indicating a priority class of the communication service, and a bearer identifier for identifying a bearer for the communication service.

In the fourth aspect, the providing-service storage unit can be configured to store priority of the communication service, and at least one of a priority identifier for identifying the priority of the communication service, a priority probability indicating a probability at which the communication service is prioritized, a maximum transmission rate of the communication service, and a guaranteed minimum rate for the communication service can be used as the priority of the communication service.

In the fourth aspect, the providing-service storage unit can be configured to store a relationship each of the radio access technologies with at least one of the communication service and the priority of the communication service, in at least one of an Attach procedure, a location registration information update procedure and a paging procedure.

A fifth aspect of the present invention is summarized as a mobile communication method in a mobile communication system including a plurality of radio access technologies, the mobile communication method including the steps of: notifying, from a network node to a mobile station, a communication service provided by a target radio access technology in which the mobile station is to be in idle mode; storing, at the mobile station, the communication service notified by the network node and provided by the target radio access technology; and starting, at the mobile station, a connection procedure on the basis of the stored communication service provided by the target radio access technology.

A sixth aspect of the present invention is summarized as a mobile exchange station used in a mobile communication system including a plurality of radio access technologies, the mobile exchange station including: a providing-service manager unit configured to manage a communication service provided by each of the radio access technologies; and a providing-service notification unit configured to notify, to a mobile station, a target radio access technology in which the mobile station is to be in idle mode, among the radio access technologies managed by the providing-service manager unit.

In the sixth aspect, the providing-service notification unit can be configured to notify the mobile station of the target radio access technology, in at least one of an Attach procedure, a location registration information update procedure and a paging procedure.

A seventh aspect of the present invention is summarized as a mobile station used in a mobile communication system including a plurality of radio access technologies, the mobile station including: a providing-service storage unit configured to store communication service notified by a network node and provided by a target radio access technology in which the mobile station is to be in idle mode; and a connection procedure performing unit configured to start a connection procedure, on the basis of the communication service stored by the providing-service storage unit and provided by the target radio access technology.

In the seventh aspect, the providing-service storage unit can be configured to store the communication service provided by the target radio access technology, which is notified in at least one of an Attach procedure, a location registration information update procedure and a paging procedure.

BRIEF DESCRIPTION OF THE DRAWINGS

FIG. 3 is a table showing an example of a table managed by a providing-service manager unit of the mobile exchange station according to the first embodiment of the present invention.

Figure 1:
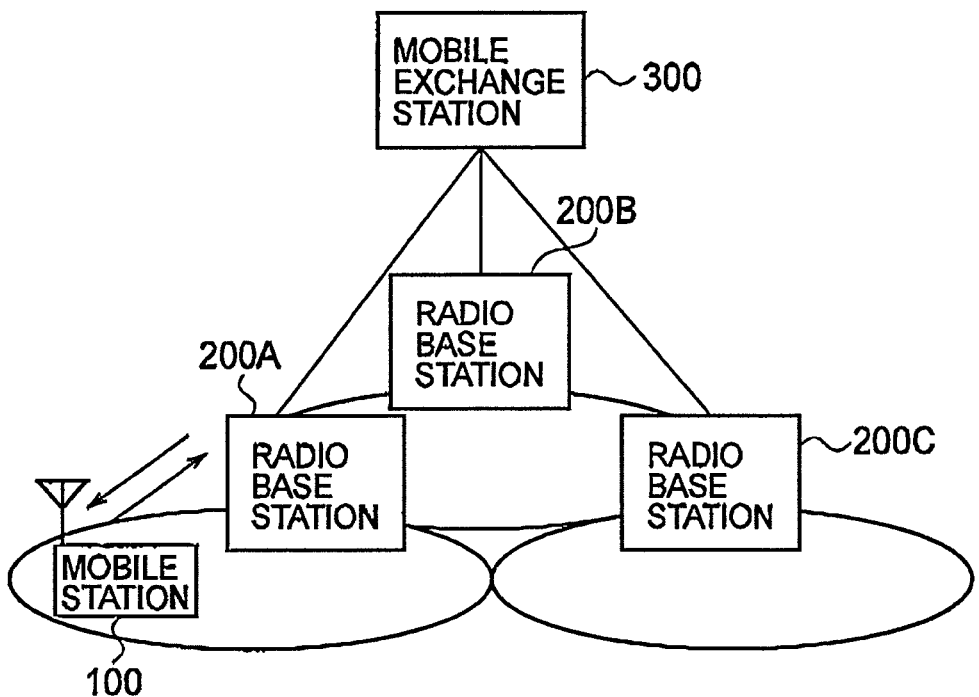
FIG. 1 is a configuration diagram of an entire mobile communication system according to a first embodiment of the present invention.

BEST MODE FOR CARRYING OUT THE INVENTION (Configuration of Mobile Communication System According to First Embodiment of Present Invention)

A configuration of a mobile communication system according to a first embodiment of the present invention is described with reference to FIG. 1 to FIG. 5. Although description is given of an example of a LTE mobile communication system as a mobile communication system in this embodiment, the present invention is applicable also to a mobile communication system other than a LTE mobile communication system.

A configuration of the mobile communication system according to the first embodiment of the present invention is described with reference to FIG. 1. It is to be noted that components having the same functions are denoted by the same reference numerals throughout the drawings for describing this embodiment, and repetition of descriptions of those components is omitted.

As shown in FIG. 1, the mobile communication system according to this embodiment includes a mobile station 100, multiple radio base stations 200A, 200B and 200C, and a mobile exchange station 300.

For example, the mobile station 100 is configured to perform an Attach procedure with the mobile exchange station 300 through the radio base station 200A, when the power is on.

The mobile station 100 is configured to perform a location registration information update procedure, when the mobile station 100 moves outside a location registration area after completing the Attach procedure.

The mobile exchange station 300 is configured to transmit a paging message to the mobile station 100 through the radio base stations 200A, 200B and 200C in the location registration area by starting a paging procedure, when receiving an incoming call to the mobile station 100.

The radio base station 200A is configured to transmit broadcast information to the mobile station 100.

The mobile station 100, performing communications with the radio base station 200A and the mobile exchange station 300, is configured to perform a release procedure with the radio base station 200A upon completion of the communications.

Figure 2:
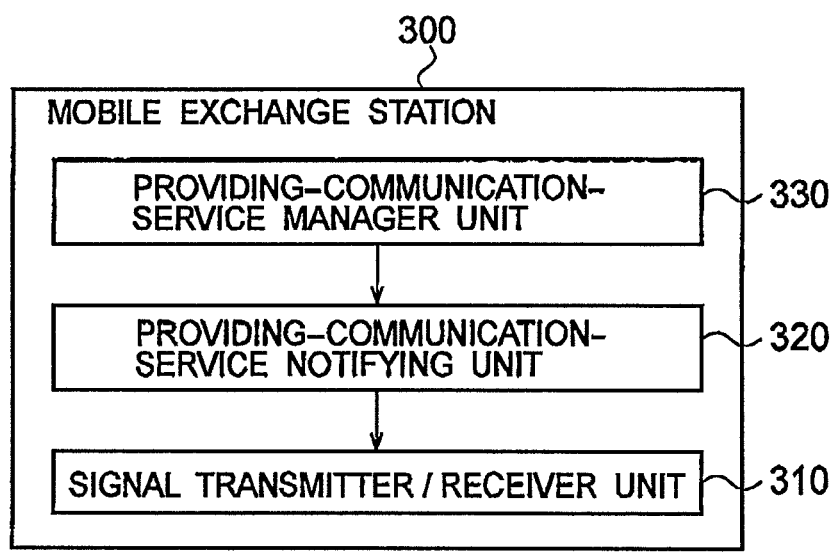
FIG. 2 is a functional block diagram of a mobile exchange station according to the first embodiment of the present invention.

As shown in FIG. 2, the mobile exchange station 300 according to the present invention includes: a signal transmitter/receiver unit 310; a providing-communication-service notifying unit 320 connected to the signal transmitter/receiver unit 310; and a providing-communication-service manager unit 330 connected to the providing-communication-service notifying unit 320.

The signal transmitter/receiver unit 310 is configured to perform signal transmission/reception processing between the mobile station 100 and the mobile exchange station 300, and signal transmission/reception processing between the radio base station 200 and the mobile exchange station 300.

The providing-communication-service notifying unit 320 is configured to notify, to the mobile station 100, a relationship between each radio access technology and at least one of communication service and priority of the communication service, the relationship being managed by the providing-communication-service manager unit 330.

For example, the providing-communication-service notifying unit 320 may be configured to notify, to the mobile station 100, the relationship between each radio access technology and at least one of communication service and priority of the communication service, in at least one of the Attach procedure, the location registration information update procedure and the paging procedure.

Here, when notifying the mobile station 100 of the above relationship in a paging procedure, the providing-communication-service notifying unit 320 may be configured to notify, to the mobile station 100, a RAT providing the incoming service, in addition to a mobile station identifier (for example, TMSI: Temporary Mobile Subscriber Identifier) and incoming-service notification information (for example, Paging Cause) which are notified by an ordinary paging message.

In addition, the communication service may be specified by any one of: a service identifier for identifying the communication service; the connection destination address for the communication service; service quality information (QoS: Quality of Service) on the communication service; a label indicating the priority class of the communication service; and a bearer identifier for identifying the bearer for the communication service.

In other words, the providing-communication-service notifying unit 320 may be configured to notify, to the mobile station 100, the communication service provided by each radio access technology, by using any one of: the service identifier for identifying the communication service; the connection destination address for the communication service; the service quality information on the communication service; the label indicating the priority class of the communication service; and the bearer identifier for identifying the bearer for the communication service.

As the communication service priority, used may be at least one of: a priority identifier for identifying the priority of the communication service; a priority probability showing the probability at which the communication service is prioritized; a maximum transmission rate of the communication service; and a guaranteed minimum rate for the communication service.

The providing-communication-service manager unit 330 is configured to manage at least one of communication service provided by each radio access technology and priority of the communication service.

For example, the providing-communication-service manager unit 330 is configured to manage the correspondence relationship of "communication service" with "provided or not provided (indicating whether or not the radio access technology provides the communication service)", "service identifier", "connection destination address", "QoS", "bearer identifier" and "label", as shown in FIG. 3(a).

Note that, the providing-communication-service manager unit 330 only needs to be configured to manage at least one of "service identifier", "connection destination address", "QoS", "bearer identifier" and "label", for each radio access technology.

Here, "location information" shown as an example of "communication service" indicates service for notifying location information on the mobile station 100, concretely, navigation service to a destination, or the like.

Alternatively, the providing-communication-service manager unit 330 is configured to manage the correspondence relationship of "communication service" with "priority identifier", "priority probability", "maximum transmission rate" and "guaranteed minimum rate", for each radio access technology, as shown in FIG. 3(b).

Note that, the providing-communication-service manager unit 330 only needs to be configured to manage at least one of "priority identifier", "priority probability", "maximum transmission rate" and "guaranteed minimum rate", for each radio access technology.

Figure 4:
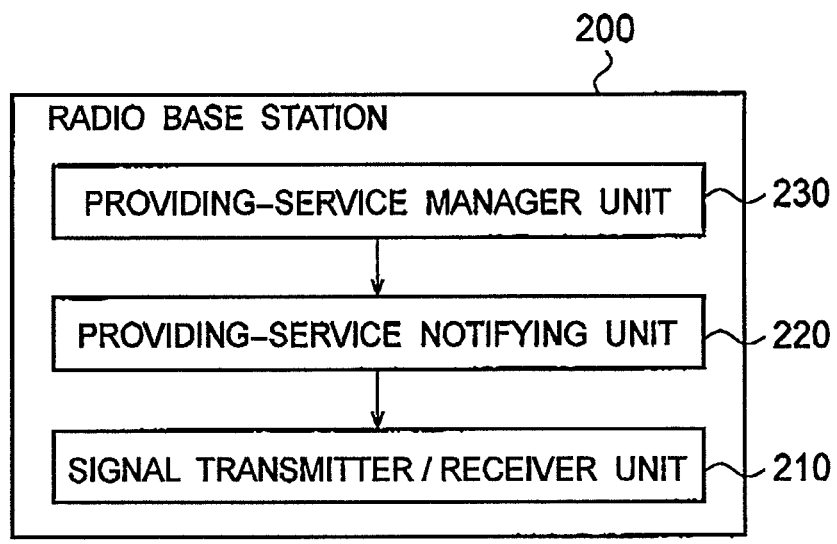
FIG. 4 is a functional block diagram of a radio base station according to the first embodiment of the present invention.

As shown in FIG. 4, the radio base station 200 according to this embodiment includes: a signal transmitter/receiver unit 210; a providing-service notifying unit 220 connected to the signal transmitter/receiver unit 210; and a providing-service manager unit 230 connected to the providing-service notifying unit 220.

The signal transmitter/receiver unit 210 is configured to perform signal transmission/reception processing between the mobile station 100 and the radio base station 200, and signal transmission/reception processing between the mobile exchange station 300 and the radio base station 200.

The providing-service notifying unit 220 is configured to notify, to the mobile station 100, the relationship between each radio access technology and at least one of communication service and priority of the communication service, the relationship being managed by the providing-service manager unit 230.

The providing-service notifying unit 220 may be configured to notify, to the mobile station 100, the relationship between each radio access technology and at least one of communication service and priority of the communication service, in at least one of a broadcast information notifying procedure, a connection procedure and a release procedure.

In addition, the communication service may be specified by any one of: a service identifier for identifying the communication service; the connection destination address for the communication service; service quality information on the communication service; a label indicating the priority class of the communication service; and a bearer identifier for identifying the bearer for the communication service.

In other words, the providing-service notifying unit 220 may be configured to notify, to the mobile station 100, the communication service provided by each radio access technology, by using any one of: the service identifier for identifying the communication service; the connection destination address for the communication service; the service quality information on the communication service; the label indicating the priority class of the communication service; and the bearer identifier for identifying the bearer for the communication service.

As the communication service priority, used may be at least one of: a priority identifier for identifying the priority of the communication service; a priority probability showing the probability at which the communication service is prioritized; a maximum transmission rate of the communication service; and a guaranteed minimum rate for the communication service.

The providing-service manager unit 230 is configured to manage at least one of communication service provided by each radio access technology and priority of the communication service.

For example, the providing-service manager unit 230 is configured to manage the correspondence relationship of "communication service" with "provided or not provided (indicating whether or not the radio access technology provides the communication service)", "service identifier", "connection destination address", "QoS", "bearer identifier" and "label", as shown in FIG. 3(*a*).

Note that, the providing-service manager unit 230 only needs to be configured to manage at least one of "service identifier", "connection destination address", "QoS", "bearer identifier" and "label", for each radio access technology.

Alternatively, the providing-service manager unit 230 is configured to manage the correspondence relationship of "communication service" with "priority identifier", "priority probability", "maximum transmission rate" and "guaranteed minimum rate", for each radio access technology, as shown in FIG. 3(*b*).

Note that, the providing-service manager unit 230 only needs to be configured to manage at least one of "priority identifier", "priority probability", "maximum transmission rate" and "guaranteed minimum rate", for each radio access technology.

Figure 5:
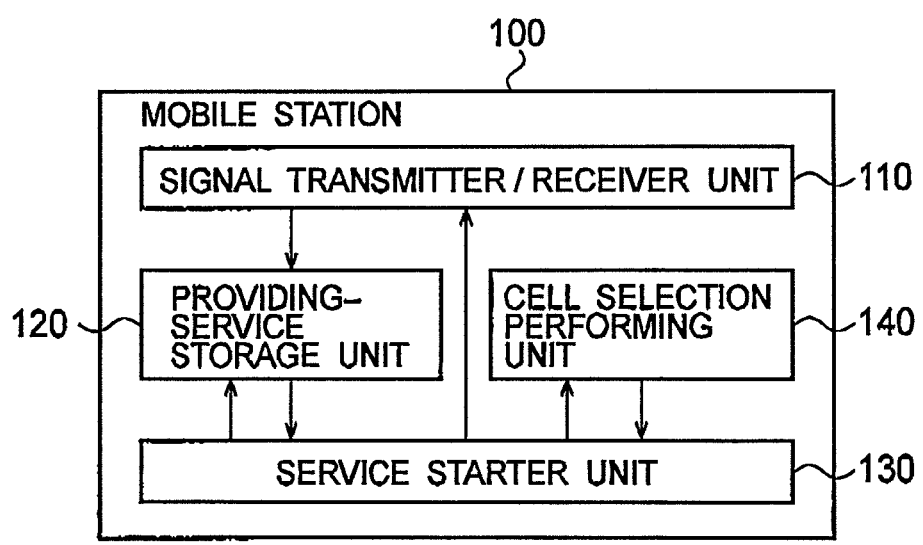
FIG. 5 is a functional block diagram of a mobile station according to the first embodiment of the present invention.

As shown in FIG. 5, the mobile station 100 according to this embodiment includes: a signal transmitter/receiver unit 110; a providing-service storage unit 120 connected to the signal transmitter/receiver unit 110; a service starter unit 130 connected to the providing-service storage unit 120 and the signal transmitter/receiver unit 110; and a cell selection performing unit 140 connected to the service starter unit 130.

The signal transmitter/receiver unit 110 is configured to perform signal transmission/reception processing with the radio base station 200, and signal transmission/reception processing with the mobile exchange station 300.

For example, the signal transmitter/receiver unit 110 performs signal transmission/reception processing for an Attach procedure performed when the power of the mobile station 100 is on, and performs signal transmission/reception processing for a location registration information update procedure, a paging procedure, a broadcast information reception procedure, a connection procedure or a release procedure.

The providing-service storage unit 120 is configured to receive and store at least one of the communication service provided by each radio access technology and the priority of the communication service, from a network node (the mobile exchange station 300, the radio base station 200 or the like).

For example, the providing-service storage unit 120 may be configured to receive and store the relationship between each radio access technology and at least one of communication service and priority of the communication service, in at least one of an Attach procedure, a location registration information update procedure and a paging procedure.

When a network node notifies, to the providing-service storage unit 120, "connection destination address", "QoS", "bearer identifier" and "label" as communication service provided by each radio access technology, the providing-service storage unit 120 may be also configured to replace "connection destination address", "QoS", "bearer identifier" and "label" with "service identifier" and to then store "service identifier".

"Information indicating communication service provided by each radio access technology" stored in the providing-service storage unit 120 may be stored together with information on the radio access technology (the frequency used by the radio access technology, and the like) notified by using broadcast information.

For example, when receiving a response signal indicating that Combined Attach processing has been performed, from a network node in the LTE system in an Attach procedure, the providing-service storage unit 120 may be also configured to store communication service provided by the LTE system by assuming that CS service is not provided by the LTE system.

When receiving a response signal indicating that normal Attach processing has been performed, from a network node in the LTE system in an Attach procedure, on the other hand, the providing-service storage unit 120 may be configured to store communication service provided by the LTE system by assuming that no limitation is imposed on providing-service in the LTE system.

The service starter unit 130 is configured to start an application for using communication service such as voice communications or TV telephone communications.

The cell selection performing unit 140 is configured to determine a cell with which a connection procedure is to be started, on the basis of the communication service provided by each radio access technology or the priority of the communication service, stored by the providing-service storage 120.

For example, the cell selection performing unit 140 is configured to detect a cell belonging to a radio access technology providing communication service usable by the application started by the service starter unit 130, and to then reselect the cell.

When the priority of the communication service provided by each radio access technology is also notified, on the other hand, the cell selection performing unit 140 is configured to reselect a cell in consideration of the priority of the communication service as well.

The above-described application is configured to start a connection procedure with the cell determined by the cell selection performing unit 140.

(Operation of Mobile Communication System According to First Embodiment of Present Invention)

Figure 6:
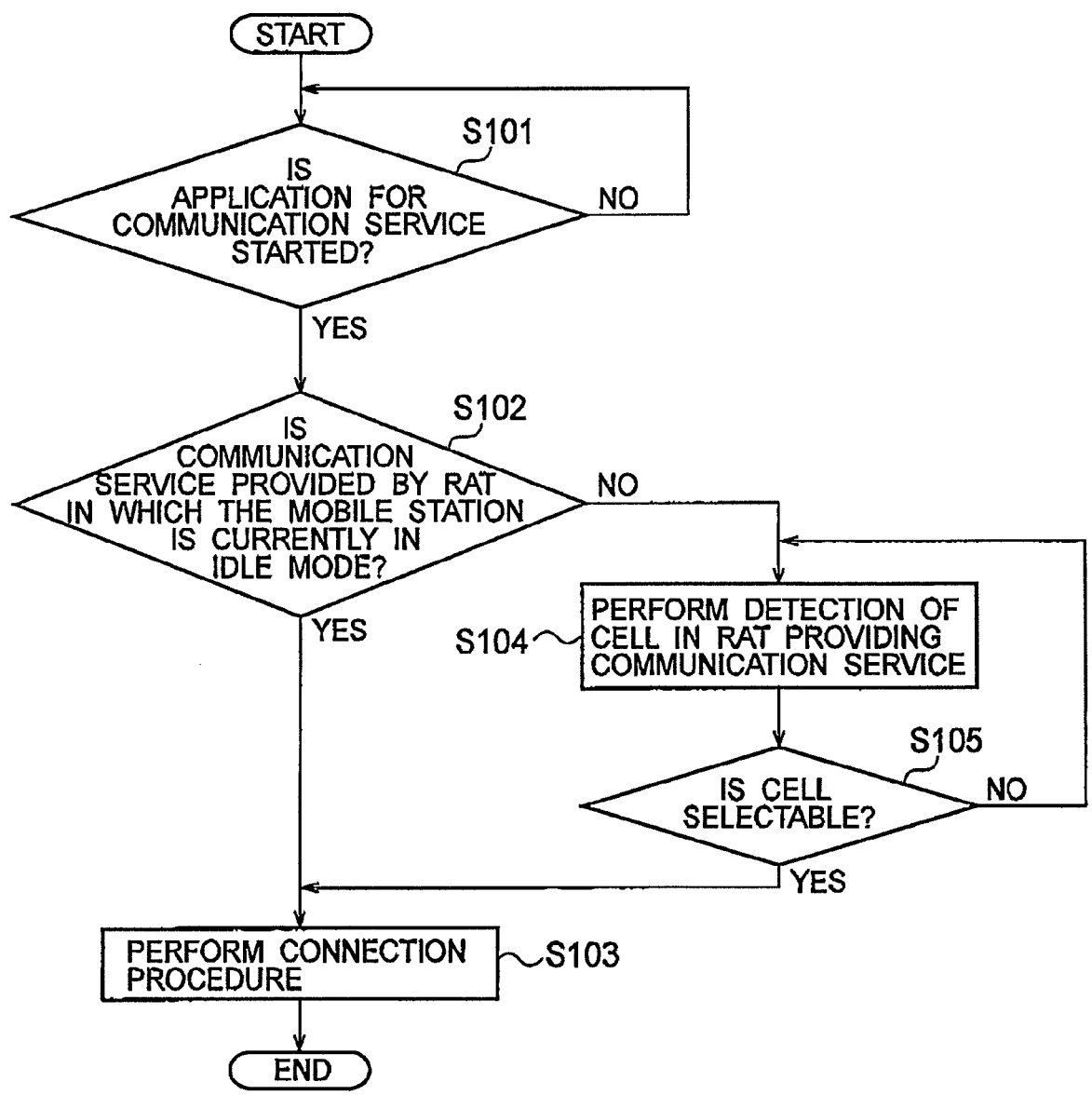
FIG. 6 is a flowchart showing operation of the mobile station according to the first embodiment of the present invention.
Figure 7:
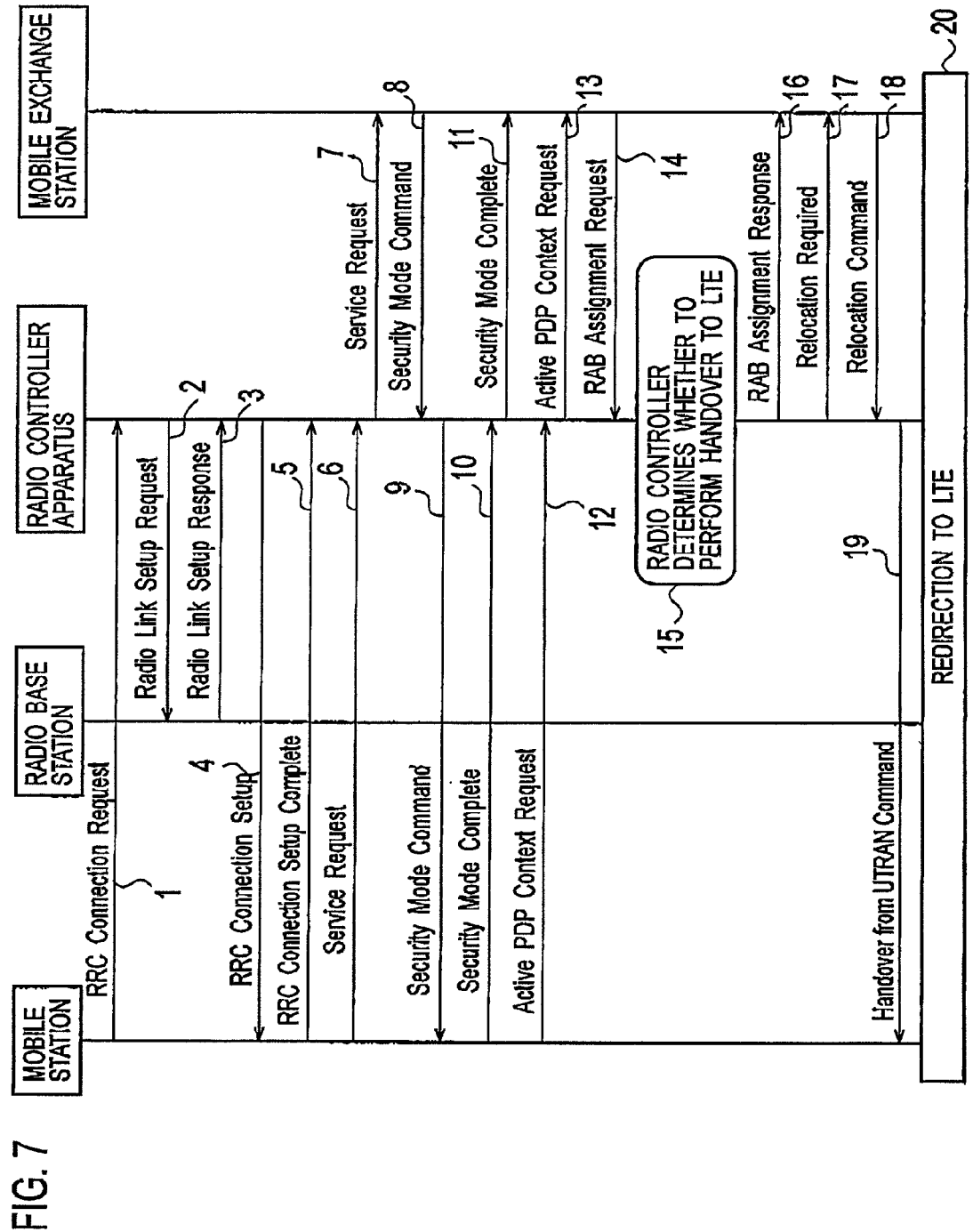
FIG. 7 is a sequence diagram showing an Inter-RAT handover procedure in a conventional mobile communication system.

With reference to FIG. 6, description is given of the mobile communication system, specifically, operation of the mobile station, according to the first embodiment of the present invention. In this embodiment, described is an example of a case in which a network node (the mobile exchange station 300 or the radio base station 200) provides only communication service provided by each radio access technology, to the mobile station 100.

As shown in FIG. 6, in Step S101, the mobile station 100 judges whether or not an application for desired communication service is started.

Here, the application for the desired communication service may be started by a call operation by a user, or may be started upon receipt of a paging message.

When the application for the desired communication service is not started in Step S101, the operation returns to START.

When the application for the desired communication service is started in Step S101, the mobile station 100 judges whether or not the desired communication service is provided by a radio access technology in which the mobile station 100 is currently in an idle mode, in Step S102.

When judging that the desired communication service is provided by the radio access technology in which the mobile station 100 is currently in an idle mode, the mobile station 100 performs a connection procedure with a cell in the radio access technology in which the mobile station 100 is currently in an idle mode, that is, transmits a connection request signal (RRC Connection Request) to a cell in the radio access technology in which the mobile station 100 is currently in an idle mode, in Step S103.

When judging that the desired communication service is not provided by the radio access technology in which the mobile station 100 is currently in an idle mode, the mobile station 100 detects a cell belonging to a RAT providing the desired communication service, in Step S104.

In Step S105, the mobile station 100 judges whether or not reselection of the cell belonging to the RAT providing the desired communication service is possible.

Here, when judging that the reselection of the cell is possible, the mobile station 100 performs a connection procedure with the reselected cell in the radio access technology providing the desired communication service, in Step S103.

When the mobile station 100 judges that the reselection of the cell is not possible, on the other hand, this operation returns to Step S104.

(Operations and Effects of Mobile Communication System According to First Embodiment of Present Invention)

According to the mobile communication system of this embodiment, on the basis of communication service requested by the mobile station 100, a cell in a RAT suitable for providing the communication service is autonomously selected. Accordingly, Inter-RAT handover which used to be performed is no longer needed. In this way, the mobile communication system of this embodiment can reduce processing load of each network node and reduce a connection time to establish a U-plane after a calling operation by a user.

(Modification 1)

In a modification 1 of the present invention, such a configuration is made that a network node (a mobile exchange station 300 or a radio base station 200) would provide communication service provided by each radio access technology and the priority of the communication service, to a mobile station 100.

With reference to FIG. 6, description is given of a mobile communication system, specifically, operation of the mobile station, according to the modification 1. In the following, described are mainly differences of the operation from the above-described operation of the mobile communication system according to the first embodiment.

As shown in FIG. 6, in Step S102, the mobile station 100 judges whether or not the desired communication service is provided by the radio access technology in which the mobile station 100 is currently in an idle mode.

The operation advances to Step S103, when the mobile station 100 judges that the desired communication service is provided by the radio access technology in which the mobile station 100 is currently in an idle mode and the priority of the desired communication service (for example, voice communications) in the radio access technology is higher than that of the desired communication service (for example, voice communications) in each of all the other radio access technologies.

Otherwise, the mobile station 100 selects a radio access technology having the highest priority of the desired communication service (for example, voice communications), from the RATs providing the desired communication service, and detects a cell belonging to the radio access technology, in Step S104.

(Modification 2)

In a modification 2 of the present invention, such a configuration is made that a network node (a mobile exchange station 300 or a radio base station 200) would provide only the priority of communication service provided by each radio access technology, to a mobile station 100.

With reference to FIG. 6, description is given of a mobile communication system, specifically, operation of the mobile station, according to the modification 2. In the following, described are mainly differences of the operation from the above-described operation of the mobile communication system according to the first embodiment.

As shown in FIG. 6, when the mobile station 100 judges that QoS required by the desired communication service satisfies the priority (for example, priority probability, maximum transmission rate, guaranteed minimum rate and the like) of the desired communication service in the radio access technology in which the mobile station 100 is currently in an idle mode, in Step S102, this operation advances to Step S103.

Otherwise, the mobile station 100 selects a radio access technology satisfying the QoS required by the desired communication service (for example, voice communications), from the RATs providing the desired communication service, and detects a cell in the radio access technology, in Step S104.

Here, the operations of the mobile station 100 and the radio base stations 200 may each be implemented by hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to the processor so that the processor can read and write information from and into the storage medium. Moreover, the storage medium may be integrated into the processor. Additionally, the storage medium and the processor may be provided in an ASIC. The ASIC may be provided in a corresponding one of the mobile station UE and the radio base station eNB. Alternatively, the storage medium and the processor may be provided in a corresponding one of the mobile station UE and the base station eNB, as discrete components.

Hereinabove, the present invention is described in detail by using the above-described embodiment. However, it is apparent to those skilled in the art that the present invention is not to be limited to the embodiment described in this description. The present invention can be implemented as a modified or changed mode without departing from the spirit and scope of the present invention defined by the description in the scope of claims. Hence, what is described in this description is for illustrative purpose, and is not intended to impose any limitation on the present invention.

The entire content of Japanese Patent Application No. 2007-234618 (filed on Sep. 10, 2007) is incorporated in this description by reference.

INDUSTRIAL APPLICABILITY

As described above, according to the mobile communication method, the mobile exchange station, the radio base station and the mobile station of the present invention, on the basis of communication service requested by the mobile station, a cell in a RAT suitable for providing the communication service is autonomously selected. Hence, the mobile communication method, the mobile exchange station, the radio base station and the mobile station of the present invention can reduce processing load of each network node and reduce a connection time to establish a U-plane after a calling operation by a user, and are thus advantageous.

The invention claimed is:

1. A mobile communication method in a mobile communication system including a plurality of radio access technologies, the mobile communication method comprising the steps of:
   notifying, from a mobile exchange station to a mobile station, information on whether or not a circuit switching service is provided by a target radio access technology in which the mobile station is to be in idle mode, during an Attach procedure, the mobile station is notified of the information while the mobile station has not made a service request yet;
   storing, at the mobile station, the information notified by the mobile exchange station; and
   starting, at the mobile station, a connection procedure on the basis of the stored information.

2. A mobile exchange station used in a mobile communication system including a plurality of radio access technologies, the mobile exchange station configured to:
   manage whether or not a circuit switching service is provided by each of the radio access technologies; and
   notify, to a mobile station, information on whether or not the circuit switching service is provided by a target radio access technology in which the mobile station is to be in idle mode, among the radio access technologies managed by the mobile exchange station, during an Attach procedure, the mobile station is notified of the information while the mobile station has not made a service request yet.

3. A mobile station used in a mobile communication system including a plurality of radio access technologies, the mobile station configured to:
   store information on whether or not a circuit switching service is provided by a target radio access technology in which the mobile station is to be in idle mode, a fact being notified by a network node during an Attach procedure, the mobile station is notified of the information while the mobile station has not made a service request yet; and
   start a connection procedure, on the basis of the information stored by the mobile station.

* * * * *